United States Patent

Chmielewski et al.

[11] Patent Number: 5,841,934
[45] Date of Patent: Nov. 24, 1998

[54] METHOD FOR NOISE SUPPRESSION AND NOISE-SUPPPRESSION CIRCUIT FOR VIDEO RECORDERS

[75] Inventors: Ingo Chmielewski; Detlef Räth; Hans-Peter Arnold, all of Peine, Germany

[73] Assignee: Matsushita Electric Industrial Company, Osaka-fu, Japan

[21] Appl. No.: 500,946

[22] PCT Filed: Dec. 7, 1994

[86] PCT No.: PCT/DE94/01456

§ 371 Date: Mar. 8, 1996

§ 102(e) Date: Mar. 8, 1996

[87] PCT Pub. No.: WO95/16326

PCT Pub. Date: Jun. 15, 1995

[30] Foreign Application Priority Data

Dec. 7, 1993 [DE] Germany .................. 43 41 623.3

[51] Int. Cl.⁶ .................. H04N 9/88; H04N 9/79
[52] U.S. Cl. .................. 386/2; 386/25
[58] Field of Search .................. 386/2, 3, 25, 21, 386/47, 49, 50, 51, 76, 22; 348/241, 470, 533, 534, 535, 607, 683; H04N 9/88, 9/79

[56] References Cited

U.S. PATENT DOCUMENTS

| | | |
|---|---|---|
| 4,232,330 | 11/1980 | Heitmann . |
| 4,695,877 | 9/1987 | Matsumoto ........................... 386/25 |
| 4,731,660 | 3/1988 | Faroudja et al. . |
| 4,998,172 | 3/1991 | Kitazawa et al. ........................... 386/9 |
| 5,063,438 | 11/1991 | Faroudja . |
| 5,097,322 | 3/1992 | Kairhurst ........................... 386/9 |

FOREIGN PATENT DOCUMENTS

| | | |
|---|---|---|
| 0137994A3 | 4/1985 | European Pat. Off. . |
| 0411661A2 | 8/1990 | European Pat. Off. . |
| 0464772A2 | 7/1991 | European Pat. Off. . |

*Primary Examiner*—Robert Chevalier
*Attorney, Agent, or Firm*—Whitham, Curtis & Whitham

[57] ABSTRACT

A noise suppression apparatus and method for recorded luminance signals in which a level of an FM signal from the recording medium is detected, and the level of the recovered chroma signal is detected, the luminance signal is bandpass filtered and limited. A subtraction signal is generated based on the filtered and limited luminance signal and having magnitude based on the detected level of at least one of the chroma signal and the FM signal. The subtraction signal is subtracted from the luminance signal to generate a noise suppressed luminance signal. The passband of the bandpass filter may be varied based on at least one of the chroma signal and the FM signal.

15 Claims, 4 Drawing Sheets

METHOD FOR NOISE SUPPRESSION AND NOISE-SUPPRESSION CIRCUIT FOR VIDEO RECORDERS

BACKGROUND OF THE INVENTION

1. Field of the Invention

The invention relates to a method for noise suppression in recorded luminance signals to be reproduced, in which a disturbed frequency range of the luminance signal is filtered out and limited to generate a subtraction signal, and the subtraction signal is subtracted from the luminance signal.

The invention also relates to a noise suppression circuit for video recorders in which the video signal recorded on a recording medium is processed as a luminance signal in a luminance channel and as a chroma signal in a chroma channel for reproduction, with a subtraction signal being formed from the luminance signal in a side branch composed of a filter and a limiter, said signal being capable of being supplied to a subtraction stage in the luminance channel to suppress a frequency range that causes noise.

2. Description of the Related Art

It is known that the signals reproduced by a video recorder exhibit significantly reduced quality as a result of noise. Therefore, known video recorders have noise suppression circuits that operate in both the horizontal and vertical directions. Frequency components that create significant noise are produced in the frequency-modulated luminance signal as a result of nonlinear distortions in the magnetic recording of the luminance (Y) and chroma (C) signals, which appear in the Y-useful signal following frequency demodulation. For example, the most noticeable noise develops in VHS recording of PAL signals at 1.25 MHz (corresponding to twice the mixed-down amplitude-modulated chroma signal carrier (627 kHz)). Known noise suppression systems therefore have a "frequency trap" at 1.25 MHz to suppress the undesired frequency components. For this purpose, in a side branch of the luminance channel, the luminance signal is filtered out at 1.25 MHz and subjected to a limitation. Filtration takes place by passing the luminance signal through a high-pass filter, then limiting it, and then subjecting it to a low-pass filtration. The high-pass filter and low-pass filter together form the limits of a bandpass. The limiter is effective for a high luminance signal level, so that the subtraction signal formed in the side branch has a relatively lower amplitude than the luminance signal when the luminance signal level is high. On the other hand, when the luminance signal level is low, the limiter is practically ineffective, so that high subtraction effectiveness occurs at 1.25 MHz.

This known noise suppression circuit has the disadvantage that because of the powerful suppressing effect at 1.25 MHz, useful low-amplitude signal components in particular (detail information) are suppressed, so that noise suppression always entails a reduction of detail information.

It is known from EP-A-0 464 772 that the limiter level in the side branch can be influenced as a function of the detected chroma signal level and the detected FM signal level. A high chroma signal level results in an increase in the limiter threshold, while a high FM signal level results in a drop in the limiter threshold. As a result, when the limiter threshold is increased, larger useful signal components are used to form the subtraction signal, and are therefore adversely affected in the luminance signal as a result.

SUMMARY OF THE INVENTION

Taking our departure from the statement of the problem of preserving detail information to the greatest extent possible, the method of the species recited at the outset according to the invention is characterized by the level of the subtraction signal following the limitation being varied as a function of the level of the corresponding chroma signal and/or the FM signal tapped from the recording medium.

On the basis of the statement of the problem as presented above, the noise suppression circuit recited at the outset according to the invention is further characterized by the level of the subtraction signal after passing through the limiter being varied as a function of the level of the chroma signal and/or the FM signal.

The invention that forms the basis of the method and the circuit is based on the knowledge that suppression of noise in the luminance signal that is caused by the chroma signal is required to the maximum degree in certain signal constellations, while in other signal constellations less suppression of noise, and hence of fine detail information, is sufficient. According to the invention, the frequency range of the luminance signal that has been filtered out is subjected to limitation, with the threshold of the limiter being adjusted so that the noise component is included as completely as possible. The level of the subtraction signal thus formed and containing the noise components is then varied as a function of the level of the chroma signal or FM signal.

If the video signal to be reproduced has little or no color component, the level of the chroma signal is low and sharp suppression of the 1.25 MHz range from the luminance signal is normally not required. In this case, therefore, the subtraction signal formed in the side branch has its amplitude reduced, resulting in a reduced influence on the luminance signal. On the other hand, if the chroma signal is saturated, a maximum level of the subtraction signal is conducted to the subtractor, so that maximum suppression of the 1.25 MHz range is performed.

The level of the FM signal is a measure of the quality of the recorded information, e.g. the quality of the video tape. A poor video tape that results in severe noise in the signal to be reproduced also requires strong noise suppression. A low FM signal level therefore requires a relatively high subtraction signal amplitude. On the other hand, if the recording is of very good quality, a high FM level results that requires reduction of the amplitude of the subtraction signal, in other words a reduced influence on the luminance signal.

These two possible influences on variable noise suppression can be combined.

The influence according to the invention on the subtraction signal after it has passed through the limiter means that the subtraction signal is formed mainly by noise components and can be kept largely free of controlling components of the useful signal.

In an especially advantageous embodiment of the invention, in addition to influencing the level of the subtraction signal, the throughput range of the filter for the luminance signal in the side branch is also varied. As a result, the noise suppression can be utilized several times. In particular, consideration can be given to the fact that disturbances of the useful signal can occur in various frequency ranges, and the frequency ranges can be ranked in terms of priority. If there is no noise in the frequency range with the greatest priority, which can be determined by specific detection or on the basis of an established constellation for the level of the chroma or FM signal, the noise suppression can be directed at the frequency range with the next priority.

BRIEF DESCRIPTION OF THE DRAWINGS

The invention will now be described in greater detail with reference to preferred embodiments and with reference to the examples shown in the drawings, in which.

DETAILED DESCRIPTION OF THE EMBODIMENTS

Figure 1:
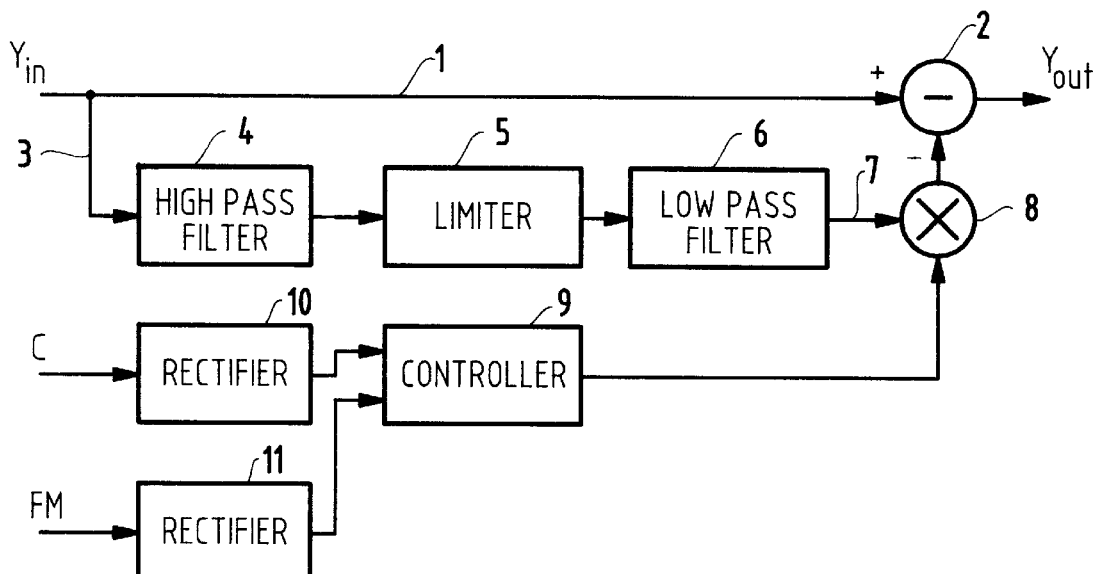
FIG. 1 is a block diagram of a noise suppression circuit according to the invention.

FIG. 1 shows a luminance channel 1 on which an incoming luminance signal Yin is transmitted and conducted as an output luminance signal $Y_{out}$. A subtraction stage 2 is incorporated into luminance channel 1.

Input luminance signal $Y_{in}$ in a side branch 3 enters a series circuit composed of a high-pass filter 4, a limiter 5, and a low-pass filter 6. This arrangement constitutes a conventional noise suppression circuit by which a subtraction signal 7 is generated and conducted to subtraction stage 2.

High-pass filter 4 and low-pass filter 6 together form a band filter structure. Limiter 5 ensures a reduced relative influence of subtraction signal 2 on luminance signal Y for a higher luminance signal level.

To implement the present invention, a multiplication stage 8 is provided in the circuit, through which the level of subtraction signal 7 can be varied. This variation is controlled by an output signal of a controller 9, which in the embodiment shown has two inputs.

One input of controller 9 is connected with the output of a rectifier 10, to which chroma signal C is supplied. Rectifier 10 determines the level of chroma signal C and controller 9 determines in particular whether the chroma signal is saturated or has a reduced level.

The other input of controller 9 is connected with the output of another rectifier 11, to which the FM signal FM tapped off the tape is supplied. The level of the FM signal is a measure of the recording quality and provides information about the noise in luminance signal Y. A low FM signal level is evaluated by controller 9 in such fashion that subtraction signal 7 is not reduced by multiplication stage 8.

Hence, there is a tendency for a high level of chroma signal C and/or a low level of FM signal FM to produce a maximum level of subtraction signal 7, supplied to subtraction stage 2.

Figure 2:
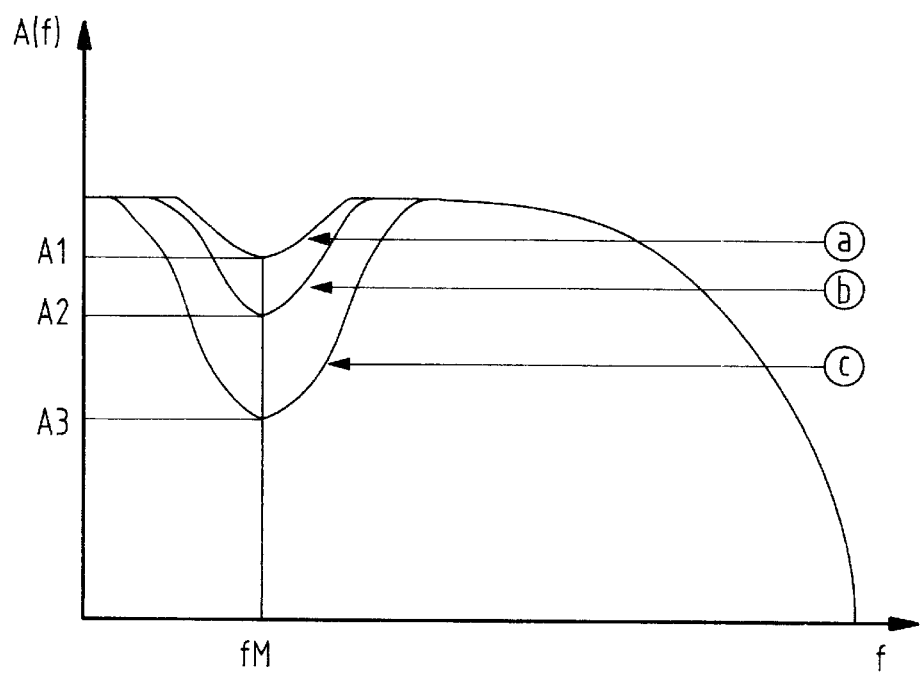
FIG. 2 shows examples of frequency characteristics of the circuit according to FIG. 1.

FIG. 2 explains the resultant frequency behavior of the noise suppression circuit shown. For a good tape (high FM level) and a low color component (low level of chroma signal C), there will be only a weak compensation that leads to the frequency characteristic a in FIG. 2.

If a poor tape is used with a low chroma component, in other words the presentation of a slightly colored area that results in a low FM level, a certain influence on the luminance signal in the frequency range around 1.25 MHz takes place as shown by curve b, FIG. 2.

Color saturation, in other words a maximum level of chroma signal C, results in strongly effective of noise suppression, in other words powerful suppression of the frequency range around 1.25 MHz of luminance signal Y, as shown by curve c, FIG. 2.

For the case corresponding to curve a, FIG. 2, noise suppression is not required. It is therefore also not effective with the circuit according to the invention, so that for this case the maximum details of the luminance signal are reproduced.

A certain reduction of detail reproduction takes place for example when a poor video tape is used, as characterized by curve b. For color saturated areas there is a strong suppression of the area around 1.25 MHz, since for this signal constellation, reproduction of fine detail does not make sense anyway. In this case, therefore, for which noise suppression is urgently needed, reduced reproduction of detail must also be taken into account.

Figure 3:
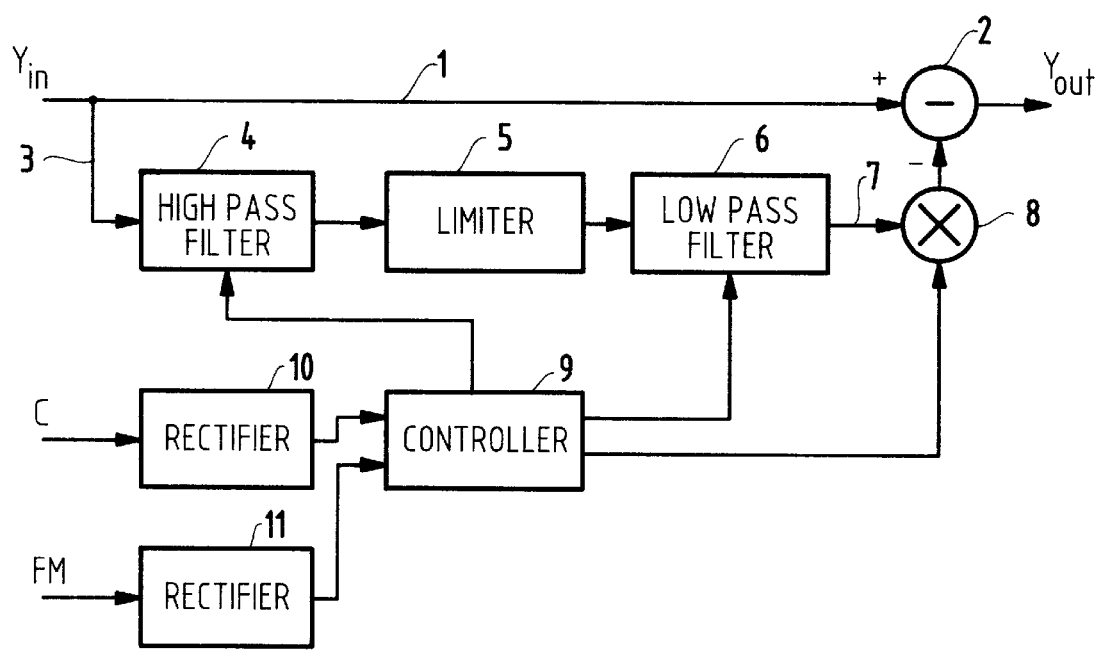
FIG. 3 is a modified block diagram according to FIG. 1 to permit the frequency range that has been filtered out to be influenced.

FIG. 3 explains a variation of the circuit according to FIG. 1 in which controller 9, by controlling multiplication stage 8, can influence the level of subtraction signal 7 but also the limiting frequencies of filters 4 and 6, so that in addition to the level of the subtraction signal the frequency range in which noise suppression occurs can also be varied.

Figure 4:
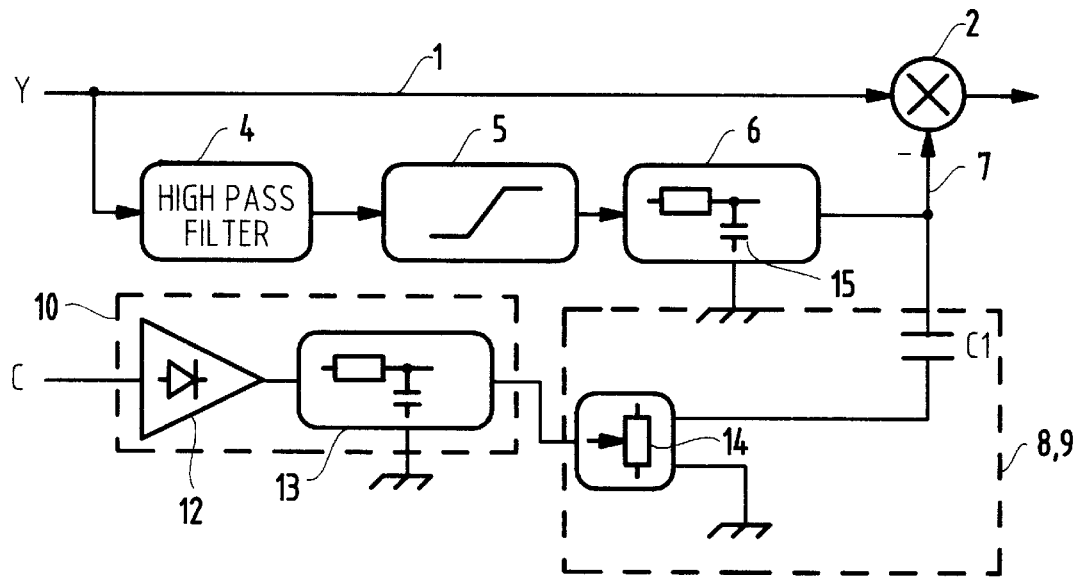
FIG. 4 is an embodiment of a circuit according to FIG. 3 for controlling noise suppression as a function of the level of the chroma signal.

FIG. 4 is a schematic diagram of a specific embodiment of the circuit according to FIG. 3, in which chroma signal C is supplied in level recognition stage 10 to a rectifying amplifier 12 and then to an integrating low-pass filter 13. The control signal thus obtained is used in a combined controller-multiplier stage 8, 9 to control a voltage-controlled resistance 14 connected in series with a capacitor C1 parallel to a low-pass capacitor 15 in low-pass filter 6. By varying variable resistor 14, the flank that limits the frequency of low-pass filter 6 is changed so that the level of subtraction signal 7 as well as the frequency of the frequency range filtered out of luminance signal 1 is altered.

Figure 5:
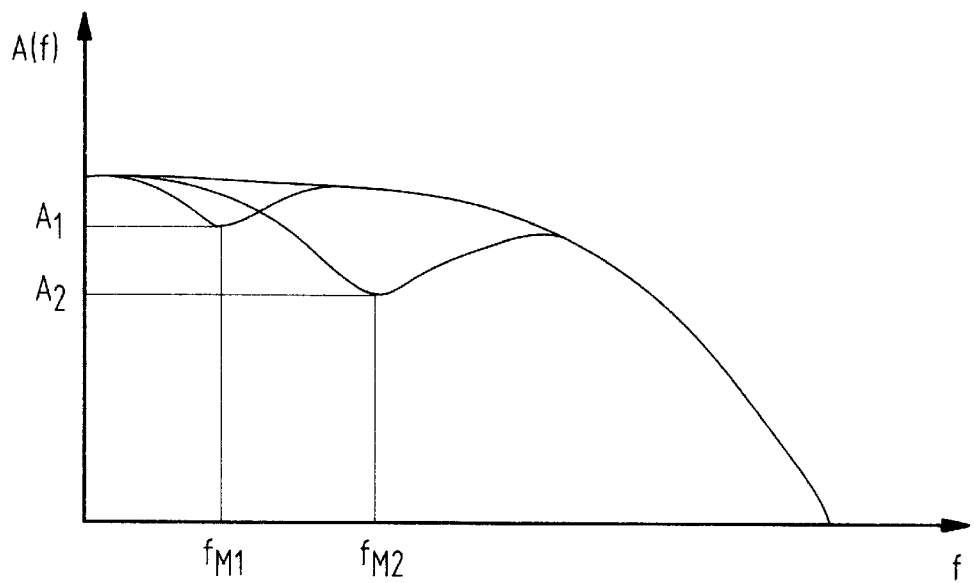
FIG. 5 shows frequency characteristics for the noise suppression for two different states of the circuit according to FIG. 4.

FIG. 5 shows that for two different chrominance levels a reduced noise suppression (with amplitude A1) is performed at mid-frequency $f_{M1}$ than at mid-frequency $f_{M2}$, where the remaining amplitude A2 is smaller.

Figure 6:
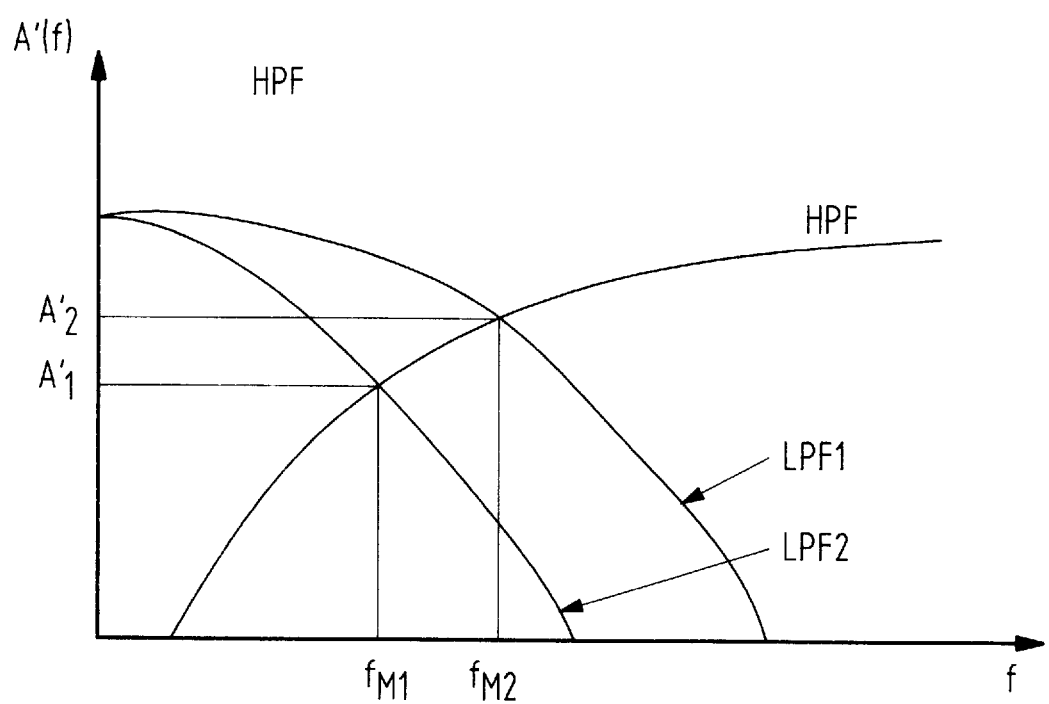
FIG. 6 is a schematic diagram showing curves for simultaneous influence on the level of the subtraction signal and the throughput range in the side branch.

FIG. 6 shows the mechanism of the circuit according to FIG. 4. High-pass filter 4 is not affected, so that the characteristic of high-pass filter HPF remains constant. The limiting frequency of the low-pass filter is varied by variable resistor 14, as shown in FIG. 6 for one case by LPF1 and for a second case by LPF2. Together with the constant characteristic of the high-pass filter HPF, a bandpass is thus formed whose mid-frequency in one case is FM1 and in the other case is FM2. The amplitudes $A'_1$ and $A'_2$ for subtraction signal A'(f) belong to this. The higher subtraction signal $A'_2$ thus results in greater depression at frequency FM2, and therefore at the lower amplitude $A_2$ of the luminance signal after leaving the noise suppression stage.

The advantage of the circuit according to the invention consists in detail reproduction being reduced only when noise suppression is also required, while in other cases detail reproduction is adversely influenced little if at all.

In addition, the circuit according to the invention can be utilized several times, with the frequency filtered out for the subtraction signal also being variable.

We claim:

1. A method for suppressing noise in recorded luminance signals to be reproduced from a recording medium, comprising the steps of:

generating a chroma signal from a recording medium;

detecting a level of the chroma signal;

tapping an FM signal from the recording medium;

detecting a level of the tapped signal;

generating a subtraction signal by passband filtering and limiting of a passband range of a luminance signal;

subtracting the subtraction signal from the luminance signal, wherein the level of the subtraction signal following the limiting is varied based on the level of the corresponding chroma signal and the FM signal tapped off the recording medium, wherein the step of generating a subtraction signal varies the passband frequency range based on at least one of the detected level of the chroma signal and the detected level of the FM signal.

2. Method according to claim 1 wherein the level of the subtraction signal is increased based on an increase in the detected level of the chroma signal.

3. A method according to claim 1 wherein the level of the subtraction signal is not reduced based on the detected level of the chroma signal, when the detected level of the chroma signal assumes a saturation level.

4. A method according to claim 1 wherein the level of the subtraction signal is reduced based on the detected level of the tapped FM signal when the detected level of the tapped FM signal increases.

5. A method according to claim 1 wherein the step of generating a subtraction signal varies a limiting frequency of the filter passband range based on at least one of the detected level of the chroma signal and the detected level of the FM signal, so that the frequency of the filter-out range and the level of the subtraction signal are varied at the same time.

6. A noise suppression circuit for video recorders, comprising:

means for tapping an FM signal off a recording medium including means for detecting a level of the tapped FM signal and means for generating an FM level signal in response;

a luminance channel having means for generating a luminance signal from the recording medium;

a chroma channel for generating a chroma signal from the recording medium and having means for generating a chroma level signal representing a level of the chroma signal; and means for generating a subtraction signal based on the luminance signal, said means being a side branch of said luminance channel, including a bandpass filter having a passband for receiving the luminance signal and generating a filtered signal in response and a limiter for receiving the filtered signal and generating an intermediate signal in response, and having a level varying means for receiving the intermediate signal and for outputting the subtraction signal with a level based on at least one of the chroma level signal and the FM level signal; and means for varying the passband of-the filter based on at least one of the chroma level signal and the FM level signal, wherein the luminance channel has a subtraction means for subtracting the subtraction signal from the luminance signal and for outputting a noise-suppressed luminance signal in response, and wherein the level varying means comprises a multiplier controlled by at least-one of the chroma level signal and the FM level signal.

7. A noise suppression circuit according to claim 6 wherein the passband has a mid-frequency of 1 .25 MHZ.

8. A noise suppression circuit according to claim 6 further comprising means for varying the passband of the filter based on the level of the subtraction signal.

9. A noise suppression circuit according to claim 6 wherein the means for varying the passband of the filter and the level varying means operate substantially simultaneously so a change in at least one of the chroma level signal and the FM level signal cause both a change in the passband of the filter and a change in the level of the subtraction signal.

10. A noise suppression circuit according to claim 9 wherein the filter includes a passband frequency determining variable resistance controlled by the chroma level signal.

11. A noise suppression circuit according to claim 10 wherein the variable resistor is in a low-pass branch of the filter.

12. A noise suppression circuit for video recorders in which the FM video signal tapped off a recording medium is processed as a luminance signal in a luminance channel and as a chroma signal in a chroma channel for reproduction, comprising:

a chroma level evaluation stage for detecting a level of the chroma signal tapped off the recording medium;

an FM signal evaluation stage for detecting a level of the FM video signal tapped off the recording medium;

means for generating a subtraction signal from the video signal tapped off the recording medium, said means including a filter and a limiter;

a luminance channel for generating a luminance signal;

a subtraction stage for subtracting the subtraction signal from the luminance signal for generating a noise-suppressed luminance signal in response, for suppression of a frequency range that causes noise, wherein the means for generating a subtraction signal has means for varying a level of the subtraction signal output from the limiter and a limiting frequency of said filter substantially simultaneously as a function of at least one of the detected level of the chroma and the detected level of the FM signal tapped off the recording medium, and wherein the filter includes a frequency-determining circuit branch having a variable resistance controlled by the level evaluation stage for the chroma signal.

13. A noise suppression circuit according to claim 12 wherein the filter has a bandpass set to a midfrequency of 1.25 MHZ.

14. A noise suppression circuit according to claim 12, wherein the means for generating a subtraction signal is a side branch of the luminance channel having a multiplication stage for outputting the subtraction signal to the subtraction stage, said multiplication stage having means for controlled by the level evaluation stage for the chroma signal and by the level evaluation stage for the FM signal.

15. A noise suppression circuit according to claim 12 wherein the variable resistance is placed in a low-pass branch.

* * * * *